Oct. 14, 1958 W. H. HOGAN 2,856,138
STEERING MECHANISM
Filed May 19, 1955 4 Sheets-Sheet 1

INVENTOR.
WALTER H. HOGAN
BY
ATTORNEY

Oct. 14, 1958

W. H. HOGAN 2,856,138

STEERING MECHANISM

Filed May 19, 1955

*INVENTOR.*
WALTER H. HOGAN
BY
*ATTORNEY*

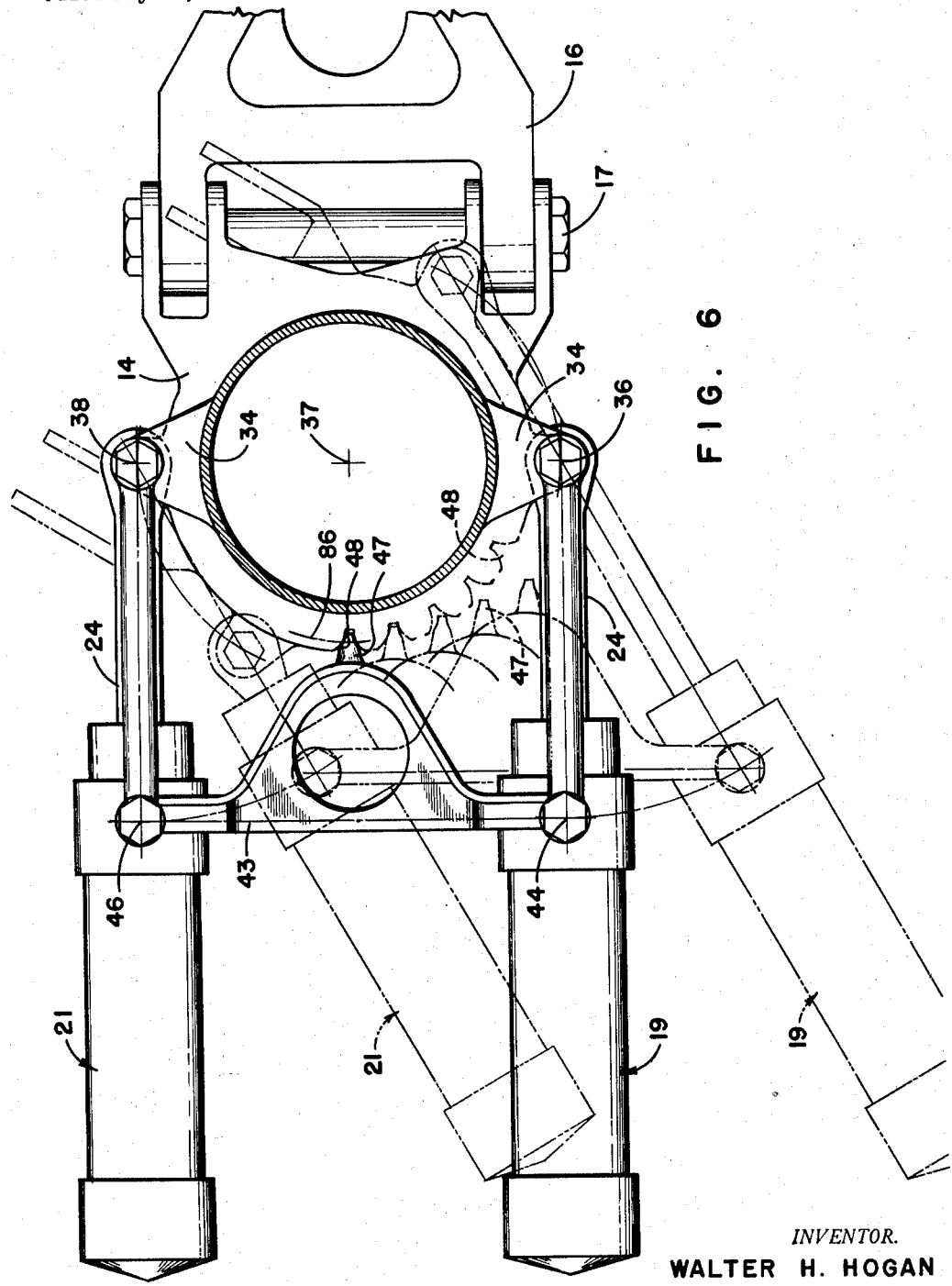

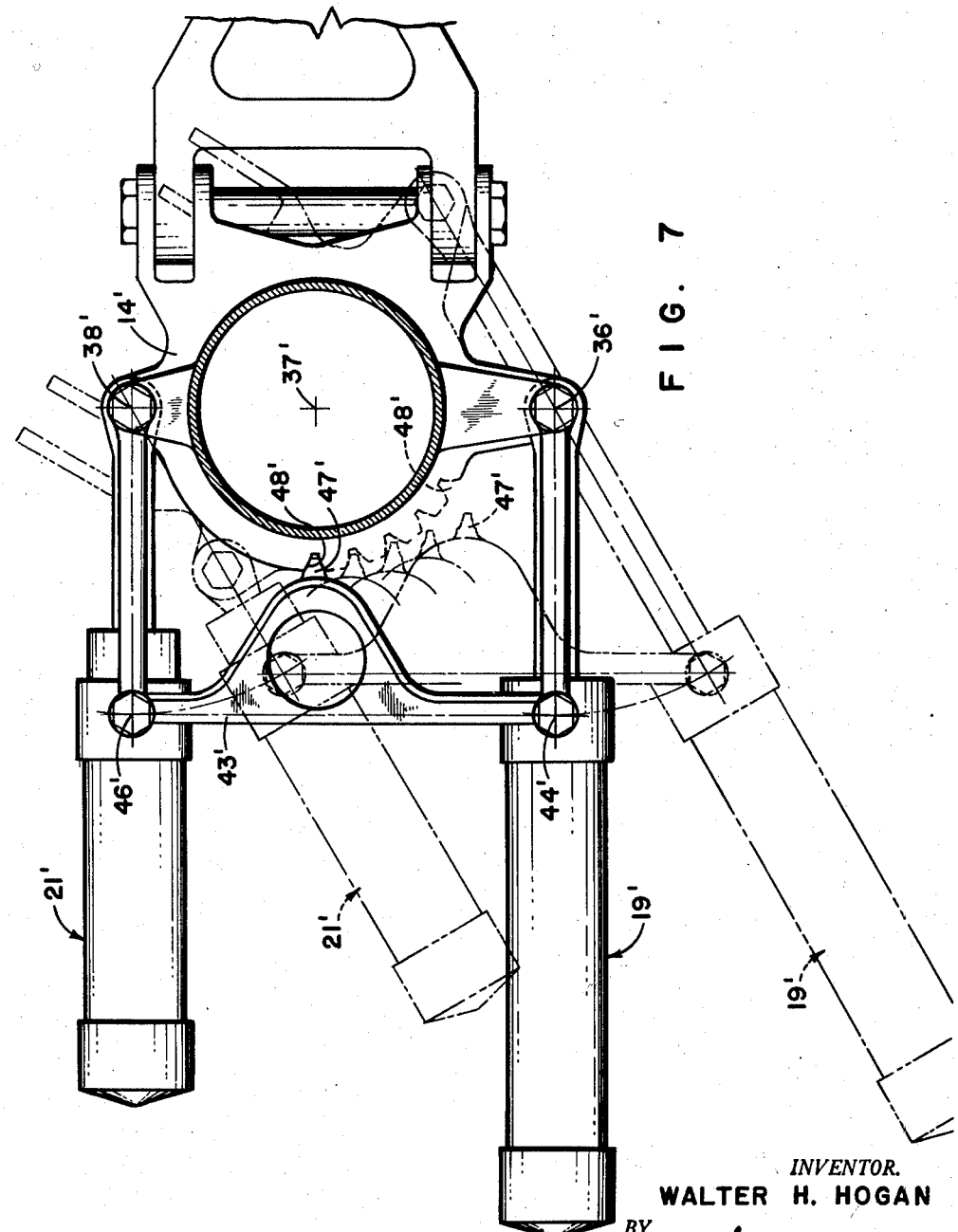

United States Patent Office 2,856,138
Patented Oct. 14, 1958

2,856,138

STEERING MECHANISM

Walter H. Hogan, Olmsted Falls, Ohio, assignor to Cleveland Pneumatic Industries, Inc., Cleveland, Ohio, a corporation of Ohio Application May 19, 1955, Serial No. 509,667

10 Claims. (Cl. 244—50)

This invention relates generally to aircraft structures and more particularly to a new and improved steering mechanism suitable for use in the ground steering of an aircraft. This is a continuation-in-part of my copending application, Serial No. 485,499 filed February 1, 1955 now abandoned in favor of this case.

In the above cited copending application I disclose a steering mechanism which is structurally simple and permits substantial reductions in weight over prior art structure. This application contains the same subject matter as the cited application and in addition discloses a modified form of structural elements.

It is an important object of this invention to provide a new and improved steering mechanism particularly adapted for use in the ground steering of an aircraft which is structurally simple, susceptible to low-cost manufacturing techniques and highly efficient.

It is another object of this invention to provide a steering mechanism capable of steering through relatively large steering angles wherein the torque efficiency is high throughout the entire range of steering.

It is still another object of this invention to provide a new and improved steering mechanism wherein a light weight, sturdy structure may be utilized, which structure requires a minimum of maintenance and is relatively immune to failure.

Further objects and advantages will appear from the following description and drawings, wherein:

Figure 6 is a diagrammatic view showing the operation of the steering mechanism in various positions of turning; and, Figure 7 is a diagrammatic view similar to Figure 6 showing the structure utilized when the cylinder pivots are not equally spaced from the central axis of the strut.

Figure 2:
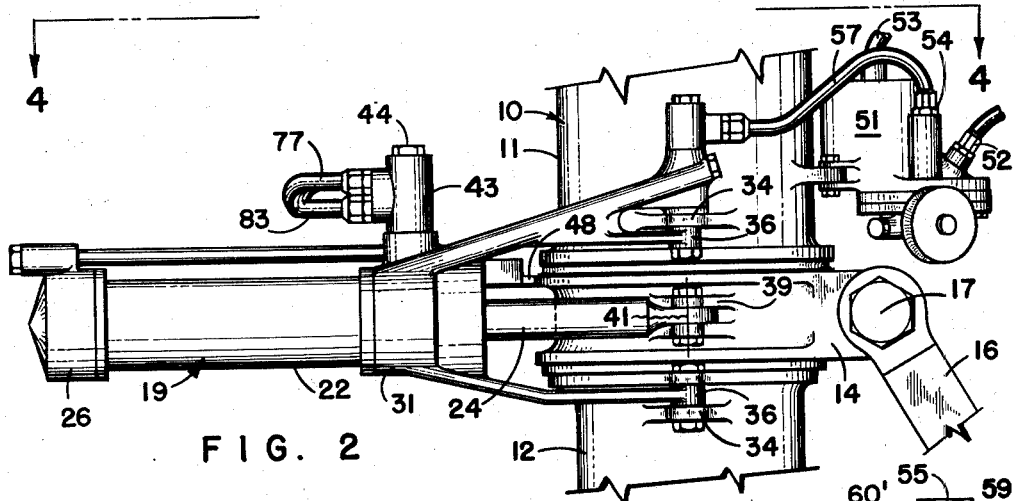
Figure 2 is a fragmentary side elevation of the assembled steering mechanism.
Figure 3:
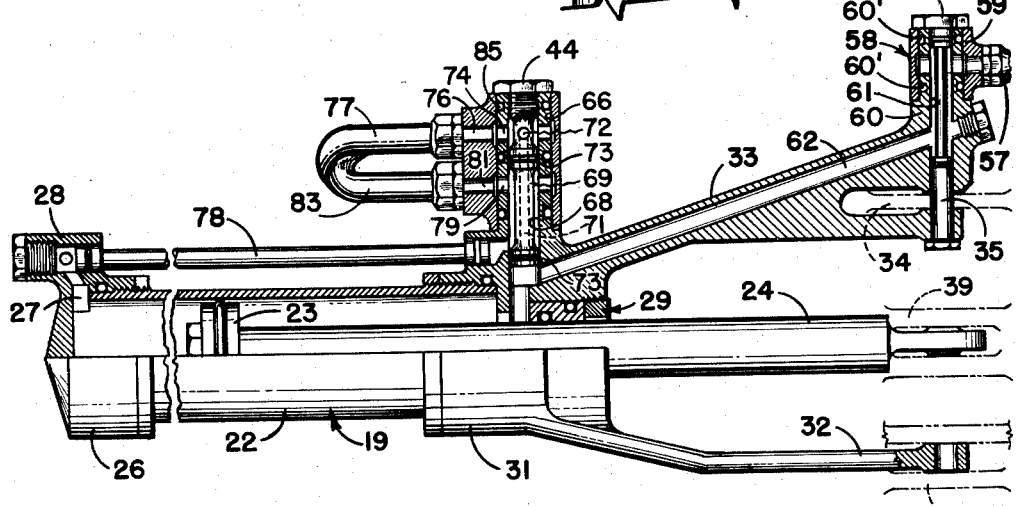
Figure 3 is a side elevation partially in longitudinal section showing the piston and cylinder structure of the steering mechanism.
Figure 1:
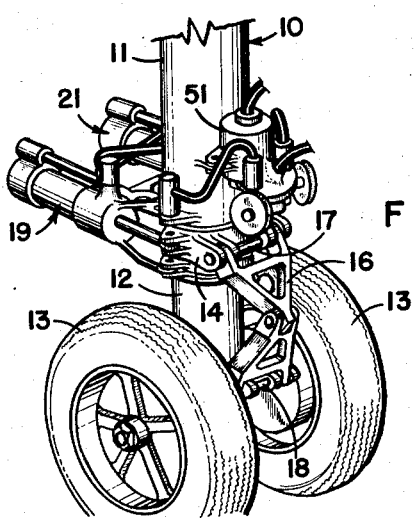
Figure 1 is a fragmentary perspective view of an aircraft nose gear incorporating a steering mechanism according to this invention.

Referring to the drawings, the steering mechanism, according to this invention, is shown as it would be applied to the nose strut 10 of an aircraft landing gear. The strut 10 proper includes an upper telescoping section 11 and a lower telescpoing section 12, which sections are axially and rotatably movable relative to each other. Wheels 13 are mounted on the lower end of the lower telescoping section 12 and the upper telescoping section 11 is mounted on an aircraft in a conventional manner. A shock absorbing mechanism would be included within the strut to cushion landing, but since it forms no part of this invention it has not been shown. A steering collar 14 is journaled on the upper telescoping section 11 for rotation relative thereto while being restrained against relative axial motion. A pair of torque arms 16 are pivoted on the steering collar as at 17 and adjacent to the lower end of the lower telescoping section 12 as at 18 and serve the function of preventing relative rotation between the steering collar 14 and the lower telescoping section 12 while permitting relative axial motion therebetween.

Two cylinder assemblies 19 and 21 are utilized to provide the mechanical power for the steering and each includes a cylinder 22 in which a piston 23 is adapted to move axially in response to fluid under pressure. A piston rod 24 is connected to each piston 23 in such a manner that the axial motion of the piston will create axial motion of the piston rod. The outer end of each cylinder 22 is closed by an end member 26 provided with a radial port 27 and a connection boss 28. The inner end of the cylinder 22 is closed by a seal assembly 29 which is provided with a central aperture through which the piston rod 24 projects. The seal assembly 29 includes a fluid seal between the piston rod and an end member 31 threaded on the cylinder 22 and prevents leakage of fluid along the piston rod 24 while permitting axial motion thereof. The end member 31 is provided with an axially extending lower arm 32 and an axially extending upper arm 33 which are pivoted on the bosses 34 formed on the upper telescoping section 11 by pivot pins 35 for rotation around an axis parallel to and spaced from the central axis 37 of the strut 10. The cylinder assembly 19 is pivoted as at 36 and the cylinder assembly 21 is pivoted as at 38 and the various members are arranged so that the axes of the pivots 36 and 38 are contained in a plane through the central axis 37. The piston rods 24 of the cylinder assemblies 19 and 21 respectively are pivoted between the pairs of bosses 39 formed on the steering collar 14 as at 41 and 42 and the proportions of the various elements are arranged so that the pivots 36 and 41 and the pivots 38 and 42 are coaxial when the steering mechanism is in the neutral position as shown in Figures 2 and 4, which is the position the elements assume when the wheels 13 are aligned with the axis of the aircraft.

Because the pivot 36 is spaced from the central axis 37 the same distance as the pivot 41, the cylinder assembly 19 will rotate around the pivot 36, when the steering collar 14 rotates around the axis 37, through an angle equal to one-half the angle of rotation of the steering collar 14. Similarly, because the pivot 38 is spaced from the axis 37 the same distance as the pivot 42, the cylinder assembly 21 will also rotate around its pivot 38 through an angle equal to one-half the angle of rotation of the steering collar 14. Therefore, if the various pivots are arranged so the cylinder assemblies are parallel in any one position other than the position wherein the corresponding pivots are coaxial, the cylinder assemblies will remain stable and parallel through all angles of turning. It should be understood that the only position in which the cylinder assemblies themselves would not be stable is the position wherein the pivots 36 and 38 are aligned with the pivots 41 and 42 respectively. In this position, which is the neutral position, the cylinder assemblies would be free to rotate around their pivots so stablizing means must be provided.

A stabilizing bar 43 is pivoted at one end on the cylinder assembly 19 as at 44 and at the other end on the cylinder assembly 21 as at 46 and is arranged so that the pivots 44 and 46, 36 and 38 form a parallelogram, thus maintaining the two cylinder assemblies parallel at all times. As best seen in Figures 4 through 6, the stabilizing bar 43 is formed with a projecting tooth 47 which projects into a cooperating notch 48 formed in the steering collar 14 when the steering mechanism is in positions approaching the neutral position.

Figure 4:
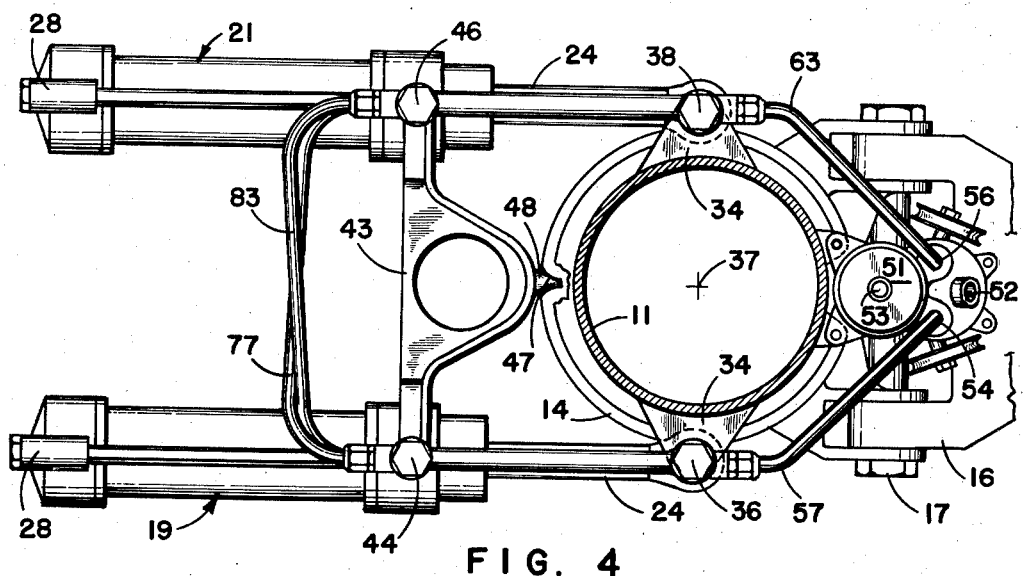
Figure 4 is a plan view taken along 4—4 of Figure 2 showing the position of the elements when the steering mechanism is in the forward or neutral position.
Figure 5:
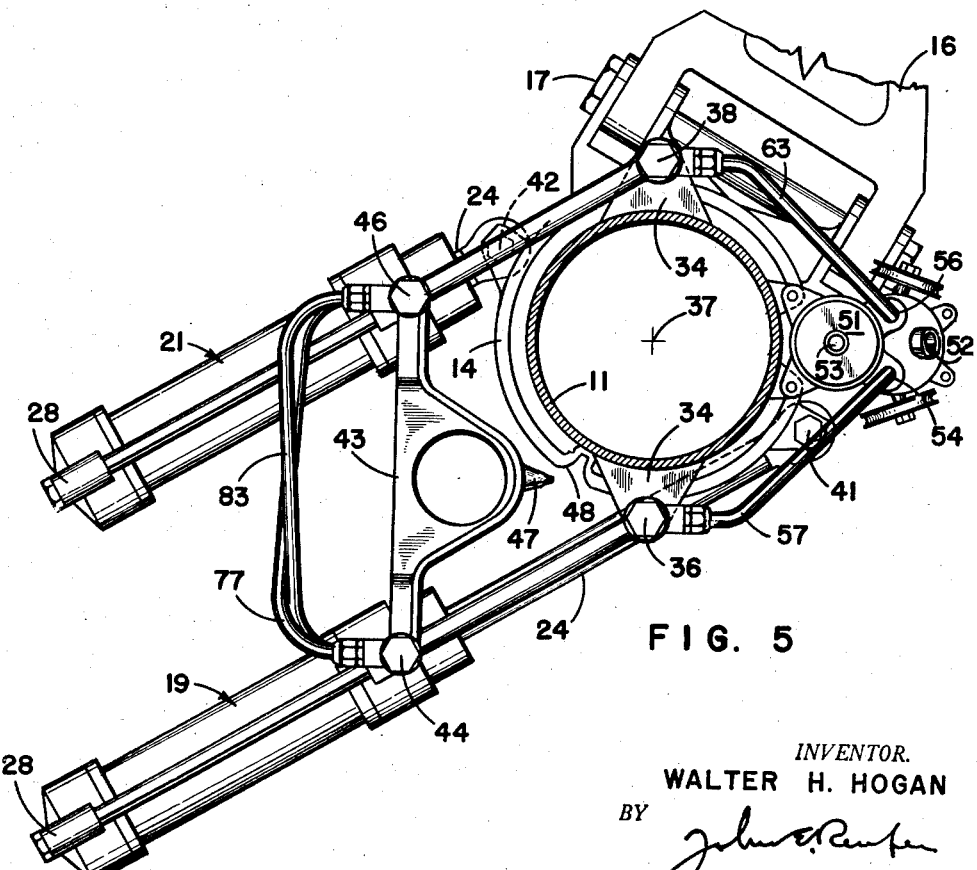
Figure 5 is a plan view similar to Figure 4 showing the position the elements assume in an extreme position of turning.

In operation, when the mechanism is in the neutral position shown in Figures 2 and 4, the pivots 36 and 38 of the cylinder assemblies 19 and 21 are aligned with the pivots 41 and 42 respectively. In this situation the stabilizing bar and the tooth 47 are utilized and prevent the cylinders from swinging away from the position shown in Figure 4 wherein the axis of the cylinder assemblies are perpendicular to the plane through the pivots 36 and 38. When, however, the steering mechanism is turned either one way or the other, the pivots 41 and 42 move out of alignment with the pivots 36 and 38 and the position of the cylinder assemblies is determined by the distance between the corresponding pivots. Because the pivots 41 and 42 are spaced from the central axis 37 a distance equal to the spacing of the pivots 36 and 38 from the central axis 37, the cylinder assemblies 19 and 21 will rotate about their respective pivots through an angle equal to one-half of the turning angle of the steering collar 14 and will, therefore, tend to track the steering collar as best shown in Figures 5 and 6. For this reason the effective torque arm of the piston rod remains relatively constant and a satisfactory torque efficiency results.

The proportions of the mechanism must be arranged so that the distance of a pitch line 86 (see Figure 6) between the tooth 47 and the notch 48 from the central axis 37 is equal to one-half of the distance between the pivots 36 and 44 and the pivots 38 and 46. Because the pivots 36, 38, 44 and 46 form a parallelogram, any point on the stabilizing bar 43 will move in a manner similar to the pivots 44 and 46 as the cylinder assemblies 19 and 21 turn around their respective pivots 36 and 38. During turning, the velocity of the notch is a function of the radius of the pitch line 86 from the central axis 37 and the angular velocity of the steering collar 14. Since the effective radius of the tooth 47 because it is on the stabilizing bar 43 is twice the radius of the pitch line 86, and since the angular velocity of the cylinder assemblies 19 and 21 is one-half the angular velocity of the steering collar 14, the tooth 47 will move with the same velocity as the notch 48 when the steering mechanism moves away from the neutral position. This is clearly illustrated in Figure 6 wherein series of phantom positions are shown, illustrating how the mechanism moves from the neutral position to an extreme position of turning. By referring to this figure, it is apparent that the tooth 47 and notch 48 stabilize the cylinder assemblies 19 and 21 when the steering mechanism is in the zone of the neutral position and that the tooth 47 actually leaves the notch 48 in the extreme positions of turning. Since the cylinder assembly is stabilized by the tooth 47 and notch 48 when the steering mechanism is in the neutral position or approaching the neutral position at which time the pivots 41 and 42 approach the respective pivots 36 and 38; and since the pivots 41, 42, 36 and 38 will determine the position of the cylinder assemblies 19 and 21 when they are spaced from each other, a stable system results in all positions.

In Figure 7, a similar steering system is shown where the distance of one of the cylinder pivots from the central axis is greater than the distance of the other cylinder pivots. This structure would be used when there is more clearance on one side of the landing gear than on the other. The referenced numerals used in Figure 7 correspond to the referenced numerals used in Figure 6; however, a prime has been added in each case.

The distance between the pivot 36' of the cylinder assembly 19' and the central axis 37' is greater than the distance between the pivot 38' of the cylinder assembly 21' and the central axis 37'. However, the distance between the corresponding cylinder and piston pivots and the central axis 37' is equal so that the cylinder assemblies 19' and 21' will rotate through an angle equal to one-half the angle of turning of the steering collar 14'. The stabilizing bar 43' is mounted on the two cylinder assemblies so that the pivots 36', 38', 44' and 46' form a parallelogram in the same manner discussed previously in Figure 6. In this case the tooth 47' is not located in the center of the stabilizing bar but is positioned so that it will be aligned with the central axis 37' when the steering mechanism is in the neutral position. In other words the tooth 47' and the notch 48' are located substantially along a plane through the central axis 37' perpendicular to a plane through the cylinder pivots 36' and 38'. Therefore, the tooth stabilizing structure will function in the same manner in the structure shown in Figure 7 as it does in the structure shown in Figure 6.

A valve mechanism is provided to control the hydraulic flow to and from the cylinder assemblies 19 and 21. This mechanism includes a valve housing 51 mounted on the upper telescoping section 11, and having hydraulic fluid under pressure supplied thereto from any suitable source such as a pump through a line 52. A return fluid line 53 connected to the upper end of housing 51 opens into a reservoir return (not shown). Also leading from valve housing 51 are two outlets 54 and 56 connected to the cylinder assemblies 19 and 21 respectively by swivel connections 58. Inasmuch as the connections of the outlets 54 and 56 with cylinders 19 and 21 are identical in construction and mode of operation, a detailed description will be given of only one connection.

A hydraulic swivel or pivot connection 58 is provided on the upper arm 33 to make it possible to use a rigid hydraulic line 57 between the outlet 54 and the cylinder assembly 19. This hydraulic pivot 58 includes a sleeve 59 journaled on a vertical projection 60 formed on the upper arm 33. The sleeve 59 is held in place by a cap member 55 threaded into the upper pivot pin 35. Seals 60' prevent leakage between the sleeve 59 and the projection 60 and permit the projection and arm 33 to rotate around the pivot 36 while the sleeve remains stationary. Therefore, the hydraulic line 57 can be connected between the sleeve 59 and the outlet 54 and will not flex or bend when the upper arm 33 rotates around the pivot. Fluid passages 61 and 62 in the upper arm 33 provide a fluid connection between the hydraulic line 57 at the sleeve 59 and the inner end of the cylinder 22. Therefore, when the outlet 54 is connected to the port 52, fluid under pressure is delivered to the forward end of the cylinder 22 and a force is created urging the piston 23 toward the outer end of the cylinder. A similar hydraulic line 63 connects the outlet 56 and the forward end of the cylinder assembly 21.

A cross connection is provided between the two cylinder assemblies 19 and 21 so that the forward end of the cylinder assembly 19 and the outer end of the cylinder assembly 21 are in fluid communication. This is accomplished by fitting the pivot 44 within a bore 66 provided within one end of the stabilizing bar 43. Pivot 44 is formed with a central bore 68 into which a stem member 69 projects. The stem member is provided with a central fluid conducting passage 71 open at its lower end to the fluid passage 62 and radial ports 72 adjacent to its upper end. Resilient seals 73 isolate the central portion of the stem member 69 from the fluid passage 62 and the radial ports 72. The pivot 44 is provided with radial ports 74 through the walls thereof in fluid communication with the ports 72 and a port 76 in the stabilizing bar 43 which in turn provides a fluid connection with a hydraulic line 77. The outer end of the cylinder assembly 19 is connected to the zone around the central portion of the stem member 69 between the seals 73 by means of a hydraulic line 78 and the pivot section 67 is provided with radial ports 79 connected with a passage 81 in the stabilizing bar which in turn is connected to a hydraulic line 83. The hydraulic lines 77 and 83 are crossed as best shown in Figures 4 and 5 and attached to a pivot 46 on the cylinder assembly 21 in a similar manner. The structure of the pivot 46 is similar to pivot 44, so its structure need not be discussed in detail. Since the hydraulic line 83 connects with the lower zone of the pivot 44 and the upper zone of the pivot 46 on the cylinder assembly 21, it provides a fluid communication between the inner end of the cylinder assembly 21 and the outer end of the cylinder assembly 19. Similarly, the hydraulic line 77 is connected to the upper zone of the pivot 44 and the lower end of the pivot 46 and, therefore, provides a fluid connection between the inner end of the cylinder assembly 19 and the outer end of the cylinder assembly 21. Seals 85 prevent leakage between the zones and, therefore, permit the two connections to operate about the same pivot axis. Because the stabilizing bar is free to rotate around the pivots 44 and 46 and because these pivots provide a fluid connection regardless of the relative rotation, it is possible to use rigid tubing for the hydraulic lines 77 and 83.

The structure of the valve 51 is arranged so that when it is desired to turn the steering mechanism to the left as shown in Figure 5, the port 52 is connected to the outlet 56 and fluid under pressure is supplied to the forward end of the cylinder assembly 21 and the rearward end of the cylinder assembly 19. At the same time the valve must be arranged to connect the outlet 54 and the reservoir return port 53 which in turn connects the rearward end of the cylinder assembly 21 and the forward end of the cylinder assembly 19 to the reservoir and permits the flow of hydraulic fluid from the cylinder assembly to the reservoir as the cylinder operates. When turning to the right, the fluid circuit is reversed and fluid under pressure is supplied to the outlet 54 and the outlet 56 is connected to the reservoir return. For a detailed description of the valve structure, reference should be made to my copending application, Serial No. 489,987, filed February 23, 1955.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A steering mechanism comprising a fixed element, a rotatable element mounted on said fixed element for rotation in either direction from a first position of angular alignment about a first axis, first and second cylinder members and cooperating fluid actuated piston members capable of relative axial movement, a mounting portion on each of said members extending therefrom generally in the same direction, each of said cylinder mounting portions being pivotally connected to one of said elements and each of said piston mounting portions being pivotally connected to the other of said elements, all of said pivot axes being parallel to said first axis, the pivots of corresponding piston and cylinder members being coaxial when said rotatable member is in said first position, a stabilizing bar pivotally connected between said cylinder members, and means operably connected between said stabilizing bar and rotatable element preventing uncontrolled rotation of said members about their pivots when said rotatable element is in said first position.

2. In a steering device of the character described, a fixed element, a rotatable element mounted on said fixed element for rotation about a first axis in both directions from a first position of angular alignment, first and second fluid cylinders, fluid actuated piston means in each of said cylinders having portions extending beyond one end thereof, each of said cylinders having mounting portions extending beyond said one end, said cylinder mounting portions each being pivoted on opposite sides of said fixed element for rotation about second axes spaced from and parallel to said first axis, said piston portions being pivoted on opposite sides of said rotatable element for rotation about third axes parallel to and spaced from said first axis, corresponding second and third axes being coaxial when said rotatable member is in said first position, a stabilizing member pivoted to each of said cylinders at points equally spaced from said second axes, the spacing between said pivots on said stabilizing member being equal to the spacing between said second axes, and means between said stabilizing bar and rotatable element preventing relative motion therebetween when said rotatable element is in said first position.

3. In a device of the character described, a fixed element, a rotatable element mounted on said fixed element for rotation about a first axis from a first position of angular alignment, first and second similar members each being pivoted on said fixed element for rotation around parallel second axes spaced from and contained in a plane through said first axis, a stabilizing bar pivotally connected between said members for rotation relative thereto around third axes equally spaced from the corresponding second axes, the spacing between said third axes being equal to the spacing between said second axes, said stabilizing bar and rotatable element providing cooperating surfaces mutually engaged when the latter is in said first position thereby preventing relative motion therebetween, a cylinder on one of said members and a cooperating fluid actuated piston, said piston being pivoted on said rotatable element for rotation around a fourth axis coaxial with the second axis of said one member when said rotatable element is in said first position.

4. In a steering device of the character described, a first element, a rotatable element mounted on said first element for rotation about a first axis in either direction away from a first position of angular alignment, a pair of fluid actuated cylinder and piston means, said cylinders each being pivoted on said first element with both pivot axes contained in a plane through said first axis, said pistons each being pivoted on said rotatable element, the pivot of each piston being coaxial with the associated cylinder pivot when said rotatable element is in said first position, a stabilizing bar pivoted on each of said cylinders at points equally spaced from the pivot of the respective cylinders on said first element, the spacing between said stabilizing bar pivots being equal to the spacing of the pivots of the cylinders on said first element, said stabilizing bar and rotatable element providing cooperating means adapted to interengage and stabilize said cylinders when said rotatable element is in said first position, the distance between the engaging portions of said cooperating means and said first axis being equal to one-half of the distance between said stabilizing bar pivots and the corresponding pivots of said cylinders on said first element.

5. In a steering device of the character described, first and second relatively rotatable concentric tubular members, a steering member rotatable on said first member in either direction from a first position of angular alignment about the central axis thereof, torque means between said steering member and said second tubular member preventing relative rotation therebetween, first and second cylinder elements and cooperating fluid actuated piston elements capable of relative axial motion, each of said cylinder elements being pivoted on said first member and each of said piston elements being pivoted on said steering member, the pivots of associated piston and cylinder members being coaxial when said steering member is in said first position, a stabilizing bar pivotally connected between said cylinder elements at points equally spaced from the pivot thereof on said first member, and interengaging means on said stabilizing bar and said steering member preventing rotation of said elements around their respective pivots when said steering member is in said first position.

6. In a steering device of the character described, first and second relatively rotatable concentric tubular members, a steering member rotatable on said first member in either direction from a first position of angular alignment about the central axis thereof, torque means between said steering member and said second tubular member preventing relative rotation therebetween, first and second cylinder elements and cooperating fluid actuated piston elements capable of relative axial motion, each of said cylinder elements being pivoted on said first member and each of said piston elements being pivoted on said steering member, all of said element pivots being spaced from and contained in a plane through said central axis when said steering member is in said first position, a stabilizing bar pivotally connected between said cylinder elements at points equally spaced from the pivot thereof on said first member, a tooth on said stabilizing bar, and a cooperating notch on said steering member proportioned to receive and engage said tooth when said steering member is in said first position, the distance between the engaging portions of said tooth and notch and said central axis being one-half the distance between said stabilizing bar pivots and the corresponding pivots between said cylinder elements and first tubular member.

7. In a device of the character described, first and second relatively rotatable concentric tubular members, a steering collar mounted on said first member for rotation about the central axis thereof in either direction away from a first position of angular alignment, torque means between said steering collar and said second member preventing relative rotation therebetween, a pair of fluid actuated cylinder and piston means, said cylinders each being pivoted on said first member with both pivot axes contained in a plane through said central axis, said pistons each being pivoted on said steering collar with said piston pivots being contained in a plane through said central axis, each said pivots being spaced from and parallel to said central axis, a stabilizing bar pivoted on each of said cylinders at points equally spaced from the pivot of the respective cylinders on said first member, the spacing between said stabilizing bar pivots being equal to the spacing of the pivots of the cylinders on said first member, a projection formed on said stabilizing bar adapted to fit into and engage a notch on said steering collar when said steering collar is in said first position, the distance of said notch and projection engagement from said central axis being equal to one-half of the distance between said stabilizing bar pivots and the corresponding pivots between said cylinder and first member.

8. In a landing gear mechanism of the character described, the combination of a landing gear strut including first and second telescoping cylinders, the first one rotationally and axially fixed relative to the aircraft and the second rotatable on its central axis, a ground engaging member operatively carried by said second cylinder, with a steering mechanism for said wheel comprising a steering collar rotatably mounted on said first cylinder, rotation transmitting means between said collar and second cylinder, first and second cylinder members and cooperating fluid actuated piston members capable of relative axial motion, a mounting portion for each of said members extending longitudinally therefrom beyond one end of each cylinder member, each of said cylinder mounting portions being pivotally connected to said first cylinder and each of said piston mounting portions being pivotally connected to said steering collar, all of said pivot axes being equally spaced and parallel to said central axis, a stabilizing bar pivotally connected between said cylinder at points equally spaced from the pivot of said cylinder portions on said first cylinder, and means operably connected between said stabilizing bar and said steering collar preventing uncontrolled rotation of said members around their pivots.

9. In a device of the character described, first and second relatively rotatable concentric tubular members, a steering collar mounted on said first member for rotation about the central axis thereof in either direction from a first position of angular alignment, torque means between said steering collar and said second member preventing relative rotation therebetween, a pair of fluid actuated cylinder and piston means, said cylinders each being pivoted on said first member with both pivot axes contained in a plane through said central axis, said pistons each being pivoted on said steering collar with said piston pivots being contained in a plane through said central axis, each said pivots being spaced from and parallel to said central axis, a stabilizing bar pivoted on each of said cylinders at points equally spaced from the pivot of the respective cylinders on said first member, the spacing between said stabilizing bar pivots being equal to the spacing of the pivots of the cylinders on said first member, a projection formed on said stabilizing bar equally spaced from said stabilizing bar pivots adapted to fit into and engage a notch on said steering collar when said steering collar is in said first position, the distance of said notch and projection engagement from said central axis being equal to one-half of the distance between said stabilizing bar pivots and the corresponding pivots between said cylinder and first member.

10. In a device of the character described, first and second relatively rotatable concentric tubular members, a steering collar mounted on said first member for rotation about the central axis thereof in either direction from a first position of angular alignment, torque means between said steering collar and said second member preventing relative rotation therebetween, a pair of fluid actuated cylinder and piston means, said cylinders each being pivoted on said first member with both pivot axes contained in a first plane through said central axis, said pistons each being pivoted on said steering collar with said piston pivots being contained in a second plane through said central axis, the spacing between one of the pivots of said cylinders and said central axis being different from the spacing between the pivot of the other cylinder and said central axis, a stabilizing bar pivoted on each of said cylinders at points equally spaced from the pivot of the respective cylinders on said first member, the spacing between said stabilizing bar pivots being equal to the spacing of the pivots of the cylinders on said first member, a projection formed on said stabilizing bar adapted to fit into and engage a notch on said steering collar when said steering collar is in said first position, said projection and notch being located substantially along a third plane through said central axis perpendicular to said first plane when said steering collar is in said first position, the distance of said notch and projection engagement from said central axis being equal to one-half of the distance between said stabilizing bar pivots and the corresponding pivots between said cylinder and first member.

References Cited in the file of this patent

UNITED STATES PATENTS

| | | |
|---|---|---|
| 2,650,782 | Fehring | Sept. 1, 1953 |
| 2,779,556 | Hogan | Jan. 29, 1957 |

FOREIGN PATENTS

| | | |
|---|---|---|
| 659,627 | Great Britain | Oct. 24, 1951 |